United States Patent Office 3,252,992
Patented May 24, 1966

3,252,992
METHOD FOR HALOMETHYLATING PHTHALOCYANINES
Peter Drenchko, Belle Mead, N.J., assignor to General Aniline & Film Corporation, New York, N.Y., a corporation of Delaware
No Drawing. Filed July 25, 1963, Ser. No. 297,665
17 Claims. (Cl. 260—314.5)

The present invention relates to a method for preparing halomethylated phthalocyanine derivatives and more specifically to a method for preparing metal-free and metal phthalocyanine derivatives containing two or three halomethyl substituents.

Halomethyl-substituted phthalocyanine derivatives are useful as intermediates in the preparation of valuable dyestuffs and dyestuff compositions, as indicated in U.S. Patents Nos. 2,547,972; 3,023,218 and 3,065,092. While in some cases halomethylated phthalocyanine products containing varying amounts of halomethyl groups per molecule are useful in the production of such dyestuffs and the like, generally it is preferred that the halomethylated phthalocyanine derivatives employed in such dyestuff preparations contain a given number, e.g., two or three, of halomethyl substituents per molecule and be in relatively pure form. Halomethylation techniques heretofore applied in commercial scale production of halomethyl-substituted phthalocyanine derivatives generally have not been completely satisfactory in providing the relatively pure products having a predictable two or three halomethyl substituents per molecule. Those techniques yielding products closely approximating the desired selectively halomethylated products undesirably require relatively complex reactant systems and operating conditions to be closely controlled in order to obtain satisfactory results.

Accordingly, it is the primary object of the present invention to provide a relatively simple and economical process for selectively halomethylating phthalocyanine compounds to provide relatively pure dihalomethylated or trihalomethylated phthalocyanine derivatives.

It is another object of the present invention to provide a method for preparing relatively pure dihalomethylated or trihalomethylated phthalocyanine compounds wherein a relatively simple reactant system is utilized.

It is a further object of the present invention to provide a process for preparing relatively pure dihalomethylated or trihalomethylated phthalocyanine compounds which does not require the utilization of an extensive purification procedure wherein the separation of the desired halomethylated phthalocyanine derivative from other halomethylated phthalocyanine compounds is carried out.

Broadly described, the present invention provides a method for preparing halomethyl-substituted phthalocyanine compounds selected from the group consisting of phthalocyanine compounds containing two halomethyl substituents and phthalocyanine compounds containing three halomethyl substituents which comprises reacting a phthalocyanine starting material selected from the group consisting of a metal-free phthalocyanine and a metal phthalocyanine with a halomethylating agent of the formula R—O—CH$_2$X, wherein X is halo (i.e., chloro, bromo, iodo, and fluoro), and R is selected from the group consisting of lower alkyl (i.e., methyl, ethyl, propyl, isopropyl, n-butyl, etc.), —CH$_2$X, and —CH$_2$—R$_1$ wherein R$_1$ is selected from the group consisting of lower alkoxy (i.e., methoxy, ethoxy, butoxy, etc.) and lower haloalkoxy, in the presence of sulfuric acid selected from the group consisting of sulfuric acid having a concentration in the range of from about 90 to about 100% and 1 to 4% oleum for a time period requisite to provide a phthalocyanine product having the predetermined number of halomethyl substituents per molecule, with the proviso that when a dihalomethylated product is to be obtained said sulfuric acid is sulfuric acid having a concentration of from about 90 to about 100%, and when a trihalomethylated product is to be obtained said sulfuric acid is 1 to 4% oleum.

Phthalocyanine compounds contemplated for utilization as starting materials in the method of the present invention include metal-free phthalocyanine derivatives and metal phthalocyanines including, for example, copper, cobalt, nickel and iron phthalocyanine compounds. Phthalocyanine starting materials containing inert substituents such as alkyl, alkoxy, aryl, halo, and the like (i.e., methyl ethyl, butyl, methoxy, ethoxy, phenyl, tolyl, chloro, bromo, etc.) are also contemplated for use.

The halomethylating agent employed in the present method may be added to the reaction mixture or formed in situ. Examples of suitable halomethylating agents which can be added to the reaction mixture include, without limitation, bischloromethyl ether, bisbromomethyl ether, bisiodomethyl ether, bisfluoromethyl ether, chloromethyl ethyl ether, bromomethyl propyl ether, chloromethyl butyl ether, chloromethoxy methoxy methane, dichloromethoxy methane, dibromomethoxy methane, chloromethoxy ethoxy methane, bromomethoxy butoxy methane, etc. Halomethylating agents contemplated for utilization in the invention which are formed in situ include the corresponding reagents formed by the interreaction of anhydrous hydrogen halide such as hydrogen chloride, hydrogen bromide and the like with a material such as formaldehyde, paraformaldehyde and methylal in the presence of the concentrated sulfuric acid catalyst. The halomethylating agents preferred for use are the dihalomethyl ethers.

In accordance with the method of the present invention, 90 to 100% sulfuric acid is utilized in the carrying out of the dihalomethylation of the respective phthalocyanine starting materials. The phthalocyanine starting material initially is mixed with 90 to 100% sulfuric acid and the halomethylating agent and/or halomethylating agent-yielding materials suitably may be added to the sulfuric acid-phthalocyanine mixture to complete the reactant system. Although the relative proportions of the halomethylating agent to phthalocyanine starting material suitably may vary over wider ranges, the halomethylating agent usually is employed in an amount corresponding to provide a mol ratio of —CH$_2$X to phthalocyanine starting material in the range of from about 2:1 to about 10:1, preferably from about 2.5:1 to about 5:1.

Dihalomethylation of the phthalocyanine starting material is then carried out by heating the resultant reactant system containing 90 to 100% sulfuric acid at a temperature above about 40° C. for a time period requisite to obtain the desired dihalomethylated products. While somewhat lower and higher temperatures suitably may be employed, temperatures preferred for utilization in obtaining the dihalomethylated products of the present invention are in the range of from about 60 to about 120° C. The actual time period requisite for obtaining the dihalomethylated phthalocyanine products in accordance with the present invention varies in each intsance depending, inter alia, upon the particular phthalocyanine starting material, halomethylating agent and temperature employed. For the above-indicated temperature ranges a time period in the range of from about 18 to about 48 hours usually is sufficient to effect the formation of the desired dihalomethylated phthalocyanine products. After the dichloromethylated phthalocyanine products are formed in the present process, extended heating thereof may, and usually does, result in deterioration of the products and, hence, heating periods in excess of those requisite to obtain the desired dihalomethylated phthalocyanine compounds preferably are avoided.

In accordance with the method of the present invention the selective trihalomethylation of the phthalocyanine starting materials is achieved by carrying out the halomethylation reaction in the presence of from about 1 to about 4% oleum. In the instance wherein trihalomethylated products are desired to be obtained, the halomethylating agent usually is employed in an amount corresponding to provide a mol ratio of —$CH_2X$ to phthalocyanine starting material in the range of from about 3:1 to about 15:1, preferably from about 3.5:1 to about 8:1. In the trihalomethylation embodiment of the present invention, temperatures usually are employed which are above about 40° C. and may range up to about 120° C. and higher, with those in the range of from about 50° C. to about 120° C. being preferred for utilization.

The reaction is carried out over a time period requisite to obtain the desired selectively trihalomethylated phthalocyanine products. As in the case of the dihalomethylation embodiment of the invention, the actual time period required in a given instance depends upon the particular reactant and temperature conditions employed. At the specifically indicated temperatures above, time periods of at least about 20 hours, generally from about 20 to about 48 hours, are sufficient to effect the desired selective trihalomethylation of the phthalocyanine starting materials. In the trihalomethylation embodiment of the present invention, the use of reaction time periods in excess of those requisite to provide the trihalomethylated phthalocyanine products does not result in a deterioration of the trihalomethyl-substituted derivatives and accordingly, such time periods suitably may be used in accordance with the invention. Such extensive heating periods, however, do not result in any additional advantages, merely detract from the economy of the process, and thus, are not preferred for utilization.

The dihalomethylated or trihalomethylated phthalocyanine products prepared in accordance with the present invention may be recovered from the sulfuric acid reactant medium by any conventional technique. For example, relatively pure dihalomethylated or trihalomethylated phthalocyanine products may be obtained from the reactant mediums employed in the present method by adding the product-containing mixture to ice water to precipitate crude halomethylated phthalocyanine product, recovering the precipitated product by filtration, washing the product solids free of acid with water and/or methanol, and drying the resulting washed product.

The method of the invention having been fully described, the following examples are given to show specific embodiments thereof. It will be understood that the examples are given for illustration purposes only and not by way of limitation. Unless otherwise indicated the proportions given in the examples are on a weight basis.

*Example I*

About 5.7 parts of finely powdered copper phthalocyanine were added slowly to 57.6 parts 100% sulfuric acid. After the addition was completed, the mixture was stirred for one hour, and then 6.1 parts bis chloromethyl ether were added at 25–30° C. The contents were then heated slowly until a temperature of 90° C. was obtained. The temperature was held at 90° C. for about 28 hours and then the reaction mixture was cooled to 20–30° C. The cooled reaction mixture was poured slowly into 140 parts ice water with additional ice being added at various intervals to maintain a temperature of 0–5° C. throughout the addition. A bright blue, finely divided suspension formed and was stirred at 0–5° C. for one hour, filtered, washed with cold water until the washings were free of acid and then dried in vacuo at 50° C. A bright blue powder was obtained which contained 10.3% chlorine which corresponds to copper di-(chloromethyl) phthalocyanine.

*Example II*

The procedure of Example I was repeated with the exception of substituting 10.8 parts bis bromomethyl ether for the bis chloromethyl ether. The resulting product was found to correspond closely to pure copper di-(bromomethyl) phthalocyanine.

*Example III*

The procedure of Example I was repeated with the exception of substituting 5.7 parts nickel phthalocyanine for the copper phthalocyanine. The product produced was essentially nickel di-(chloromethyl) phthalocyanine.

*Example IV*

The procedure of Example I was repeated with the exception of substituting 5.8 parts of cobalt phthalocyanine for the copper phthalocyanine. A bright blue powder was obtained which was essentially cobalt di-(chloromethyl) phthalocyanine.

*Example V*

The procedure of Example I was repeated with the exception of substituting six parts of iron phthalocyanine for the copper phthalocyanine. The product obtained was essentially iron di-(chloromethyl) phthalocyanine.

*Example VI*

The procedure of Example I was repeated with the exception of substituting six parts of phthalocyanine for the copper phthalocyanine. A product was obtained consisting essentially of di-(chloromethyl) phthalocyanine.

*Example VII*

To a mixture of 52 parts 100% sulfuric acid and 11.6 parts 20% oleum were added slowly 5.7 parts of finely powdered copper phthalocyanine. When the resultant mixture was homogeneous, 10.7 parts bis chloromethyl ether were added, and the reaction mixture was then heated slowly to 90° C. The temperature was held at about 90° C. for 29 hours and the reaction mixture was then cooled to 30–40° C. The finely divided blue suspension obtained was stirred, filtered, washed first with ice water until the washings were free of acid and then washed again with alcohol. After the product was dried at 60° C., a bright blue powder was obtained which contained 14% chlorine which corresponds to copper tri-(chloromethyl) phthalocyanine.

*Example VIII*

The procedure of Example VII was repeated with the exception of substituting 19 parts bis bromomethyl ether for the bis chloromethyl ether. Essentially pure copper tri-(bromomethyl) phthalocyanine was obtained.

*Example IX*

The procedure of Example VII was repeated with the exception of substituting 5.7 parts of nickel phthalocyanine for the copper phthalocyanine. A product which was essentially pure nickel tri-(chloromethyl) phthalocyanine was obtained.

*Example X*

The procedure of Example VII was repeated with the exception of substituting 5.8 parts of cobalt phthalocyanine for the copper phthalocyanine. A blue powder was obtained which was chiefly cobalt tri-(chloromethyl) phthalocyanine.

*Example XI*

The procedure of Example VII was repeated with the exception of substituting six parts of iron phthalocyanine for the copper phthalocyanine. A bright blue powder was obtained which was essentially iron tri-(chloromethyl) phthalocyanine.

*Example XII*

The procedure of Example VII was repeated with the exception of substituting 5.4 parts of phthalocyanine for the copper phthalocyanine. Essentially pure tri-(chloromethyl) phthalocyanine was obtained.

It is to be understood that the foregoing detailed description is given merely by way of illustration and that many variations may be made therein without departing from the spirit of this invention.

What is claimed is:

1. A method for preparing halomethyl-substituted phthalocyanine compounds selected from the group consisting of phthalocyanine compounds containing two halomethyl substituents and phthalocyanine compounds containing three halomethyl substituents which comprises reacting a phthalocyanine starting material selected from the group consisting of a metal-free phthalocyanine and a metal phthalocyanine with a halomethylating agent of the formula $R-O-CH_2X$, wherein X is a halogen, and R is selected from the group consisting of lower alkyl, $-CH_2X$, and $-CH_2-R_1$, wherein $R_1$ is selected from the group consisting of lower alkoxy and $-CH_2X$, in the presence of sulfuric acid selected from the group consisting of sulfuric acid having a concentration in the range of from about 90 to about 100% and 1 to 4% oleum at a temperature above about 40° C. for a time period requisite to provide a phthalocyanine product having the predetermined number of halomethyl substituents per molecule, with the proviso that when a dihalomethylated product is to be obtained said sulfuric acid is sulfuric acid having a concentration of from about 90 to about 100% and the mol ratio of halomethylating agent to phthalocyanine starting material is from about 2:1 to about 10:1, and when a trihalomethylated product is to be obtained said sulfuric acid is 1 to 4% oleum and the mol ratio of halomethylating agent to phthalocyanine is from about 3:1 to about 15:0.

2. The method according to claim 1 wherein said halomethylating agent is bis chloromethyl ether.

3. The method according to claim 1 wherein said halomethylating agent is bis bromomethyl ether.

4. The method according to claim 1 wherein said sulfuric acid is sulfuric acid having a concentration of from about 90 to about 100%.

5. The method according to claim 4 wherein said halomethylating agent is bis chloromethyl ether.

6. The method according to claim 4 wherein said halomethylating agent is bis bromomethyl ether.

7. The method according to claim 4 wherein said phthalocyanine starting material is a metal-free phthalocyanine.

8. The method according to claim 4 wherein said phthalocyanine starting material is a metal phthalocyanine.

9. The method according to claim 8 wherein said metal phthalocyanine is a copper phthalocyanine.

10. The method according to claim 4 wherein said reaction is carried out at a temperature in the range of from about 60° to about 120° C. for a time period in the range of from about 18 to about 48 hours.

11. The method according to claim 1 wherein said sulfuric acid is from 1 to about 4% oleum.

12. The method according to claim 11 wherein said halomethylating agent is bis chloromethyl ether.

13. The method according to claim 11 wherein said halomethylating agent is bis bromomethyl ether.

14. The method according to claim 11 wherein said phthalocyanine starting material is a metal-free phthalocyanine.

15. The method according to claim 11 wherein said phthalocyanine starting material is a metal phthalocyanine.

16. The method according to claim 15 wherein said metal phthalocyanine is a copper phthalocyanine.

17. The method according to claim 11 wherein said reaction is carried out at a temperature in the range of from about 50 to about 120° C. for a time period of at least about 20 hours.

References Cited by the Examiner

FOREIGN PATENTS

| | | |
|---|---|---|
| 681,917 | 10/1952 | Great Britain. |
| 686,391 | 1/1953 | Great Britain. |
| 843,726 | 7/1952 | Germany. |

OTHER REFERENCES

Berezovskii et al., "Theilheimer's Synthetic Methods of Organic Chemistry," Vol. 8 (1954), page 325.

WALTER A. MODANCE, *Primary Examiner.*

JAMES A. PATTEN, *Assistant Examiner.*